United States Patent
Kanka et al.

(10) Patent No.: US 8,328,918 B2
(45) Date of Patent: Dec. 11, 2012

(54) MIST ELIMINATOR SYSTEM FOR A GAS SCRUBBER

(75) Inventors: Helmut Kanka, Duisburg (DE);
Matthias Jansen, Stolberg (DE);
Roland Krauss, Hueckelhoven (DE);
Roman Kaiser, Eschweiler (DE)

(73) Assignee: Munters Euroform GmbH, Aachen (DE)

( * ) Notice: Subject to any disclaimer, the term of this patent is extended or adjusted under 35 U.S.C. 154(b) by 424 days.

(21) Appl. No.: 12/525,727

(22) PCT Filed: Feb. 8, 2008

(86) PCT No.: PCT/DE2008/000245
§ 371 (c)(1),
(2), (4) Date: Apr. 13, 2010

(87) PCT Pub. No.: WO2008/095487
PCT Pub. Date: Aug. 14, 2008

(65) Prior Publication Data
US 2010/0206169 A1    Aug. 19, 2010

(30) Foreign Application Priority Data

Feb. 10, 2007  (DE) .................... 20 2007 001 942 U

(51) Int. Cl.
*B01D 45/08* (2006.01)
(52) U.S. Cl. ............... 96/232; 96/356; 96/358; 55/440; 55/442; 55/443

(58) Field of Classification Search ............... 96/181, 96/232, 300, 356, 358; 55/440, 442–443
See application file for complete search history.

(56) References Cited

U.S. PATENT DOCUMENTS

| | | | | |
|---|---|---|---|---|
| 3,870,487 A | | 3/1975 | Hurlbut et al. | 55/185 |
| 3,918,941 A | * | 11/1975 | Fallon, III | 96/229 |
| 5,486,341 A | * | 1/1996 | Bresowar | 423/243.01 |
| 5,749,930 A | * | 5/1998 | Wolf et al. | 96/228 |
| 8,002,882 B2 | * | 8/2011 | Weber | 96/232 |
| 2008/0264260 A1 | | 10/2008 | Weber | 96/189 |

FOREIGN PATENT DOCUMENTS

| | | |
|---|---|---|
| DE | 202005002674 | 5/2005 |
| WO | WO 2005107921 | * 11/2005 |

* cited by examiner

*Primary Examiner* — Duane Smith
*Assistant Examiner* — Ives Wu
(74) *Attorney, Agent, or Firm* — Andrew Wilford

(57) ABSTRACT

The invention relates to a mist eliminator system for gas scrubbers and the like. Said mist eliminator system comprises front and rear mist elimination layers in relation to the direction of the flow of gas, which layers are composed of respective rows of parallel mist elimination profiles, one layer of which being configured in the shape of a V or of an upturned V and the lateral sections of this layer extending away from the corresponding lateral sections of the other layer or extending in parallel thereto. Both mist elimination layers can be or are received on a single common carrier structure by a common lateral wall or a common supporting structure on which the lateral walls of the mist elimination layers are stationarily or detachably arranged.

5 Claims, 1 Drawing Sheet

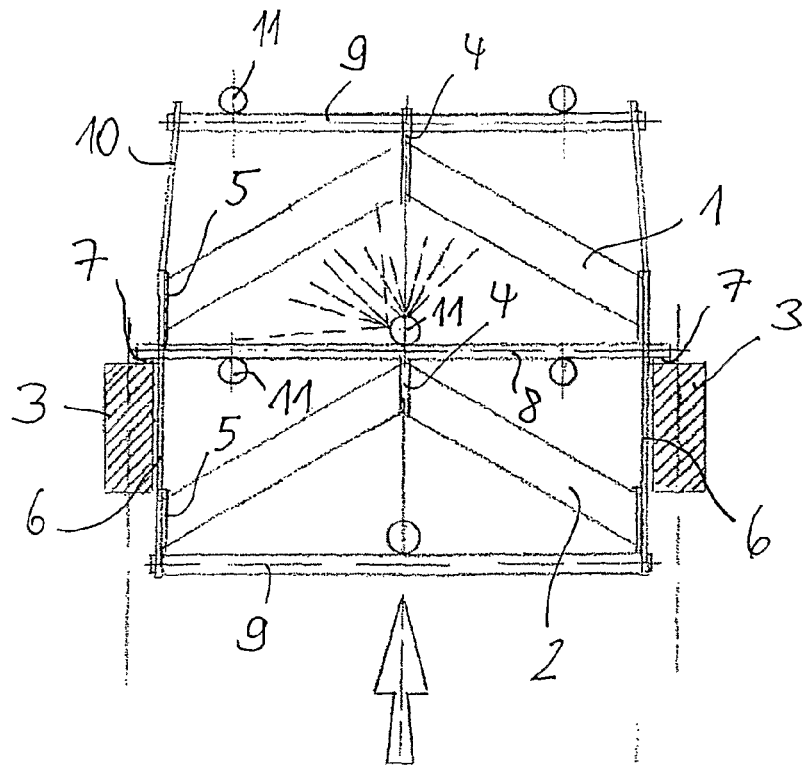
Figur 1
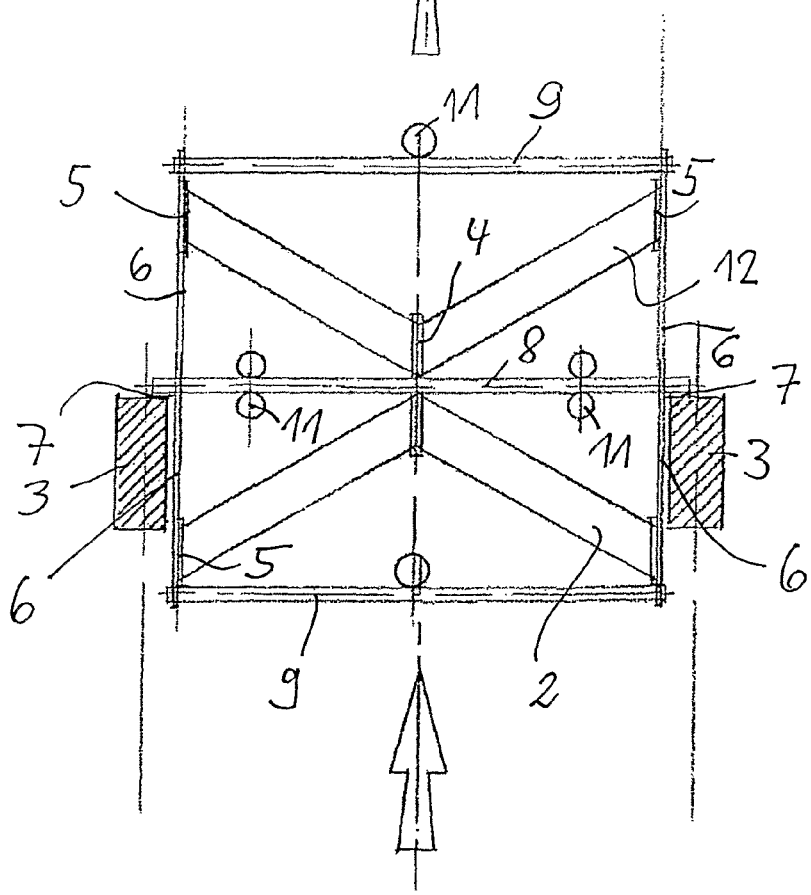
Figur 2

MIST ELIMINATOR SYSTEM FOR A GAS SCRUBBER

CROSS REFERENCE TO RELATED APPLICATIONS

This application is the US national phase of PCT application PCT/DE2008/000245, filed 8 Feb. 2008, published 14 Aug. 2008 as WO2008/095487, and claiming the priority of German patent application 202007001942.4 itself filed 10 Feb. 2007, whose entire disclosures are herewith incorporated by reference.

The present invention is directed to a mist eliminator system for gas scrubbers and the like comprising front and real mist elimination layers in relation to the direction of flow of gas, which layers are composed of respective rows of parallel mist elimination profiles, at least one layer of which being configured in the shape of a V or an upturned V and the lateral sections of this layer extending away from the corresponding lateral sections of the other layer or extending in parallel thereto.

Such mist eliminator systems are known. Since in this case the mist elimination layers have a relatively large distance from one another the same are supported on/at two different carrier structures of the gas scrubber which are disposed one above the other in a spaced condition. Accordingly, the corresponding is expense for the support of the mist eliminator layers is relatively high.

Furthermore, from EP 0 747 107 B1 it is already known with two mist separation layers forming together a lozenge and having the edges of the two layers adjacent with respect to one another to realize a support of both mist elimination layers on a single carrier structure wherein the lateral walls of the mist elimination layers have outwardly angled flanges, respectively, and are supported with these flanges on the carrier structure.

It is the object of the present invention to provide a mist eliminator system of the kind described in the beginning which has an especially simple and compact support structure.

According to the invention this object is achieved by a mist eliminator system of the cited kind according to which both mist elimination layers are supportable or supported on/at a single common carrier structure through a common lateral wall or a common support structure at which the lateral walls of the mist elimination layers are fixedly or demountably disposed.

According to the inventive mist eliminator system the lateral edges of the two mist elimination layers are disposed with a large distance from one another since the lateral sections of the mist elimination layers either extend in parallel or extend away from one another. As mentioned, it has been thus common practice according to the prior art to support both mist elimination layers on/at different carrier structures of the gas scrubber separated from one another. Now, the present invention consists in the is feature to support both layers commonly on/at a common structure even in these cases according to which the mist elimination layers have a relatively large distance from one another. This is realized by the feature that either both mist elimination layers have a common lateral wall which is used for the support or that a common supporting structure is used for both mist elimination layers at which the lateral walls of the mist elimination layers are fixedly or demountably arranged. The common lateral wall or the common supporting structure then serves for the support on/at the single carrier structure by means of suitable means, as for instance an angled flange laying on a carrier. In this manner one succeeds to support two mist eliminator systems in the flow channel of a gas scrubber with relatively small expense.

The inventive solution can cover the following embodiments of the mist eliminator system:

According to a first embodiment two parallel mist elimination layers in the shape of a V or of an upturned V are provided. According to a second embodiment one mist elimination layer in the shape of a V and one mist elimination layer in the shape of an upturned V are provided pointing with there apexes against one another. According to a third embodiment a front mist elimination layer in the shape of a V and a rear flat mist elimination layer are provided. According to a fourth embodiment a front flat and a rear mist elimination layer in the shape of an upturned V are provided.

All the above-described embodiments are characterized by the common feature that the lateral edges of the two mist elimination layers have a relatively large distance from one another which is bridged according to the invention by the arrangement of a common lateral wall or a common supporting structure.

Preferably, the common lateral wall of the common supporting structure has an outwardly angled flange lying upon a carrier of the carrier structure for the support on/at the single carrier structure. Other kinds of supporting structures are not excluded by the invention.

Preferably, the mist eliminator system has a connecting rod extending through the common lateral wall or common supporting structure wherein the connecting rod thus extends between the two opposite lateral walls or supporting structures and connects the same. By this a stabilization of the total construction is obtained. The connecting rod extends through the common lateral wall or supporting structure and preferably lies on the angled flange of the common lateral wall or supporting structure. If no angled flange is present it can be also used alone for the support of the mist eliminator system and directly rest upon the carrier of the carrier structure.

Preferably, the mist eliminator system has a rinsing means for rinsing the front side and/or rear side of at least one mist elimination layer. Preferably, this rinsing means is mounted at the common lateral wall or the common supporting structure. In this case separate posts for carrying the rinsing means are not necessary since the cross rods at which the rinsing nozzles are mounted can be directly mounted at the common lateral wall or the common supporting structure.

In the following the invention is described by means of two examples in connection with the drawing in detail. Of the drawing:

FIG. 1 is a schematic vertical section through the flow channel of a gas scrubber in which a first embodiment of a mist eliminator system is arranged; and FIG. 2 is a corresponding schematic vertical section as FIG. 1 with a second embodiment of a mist eliminator system.

In the flow channel of a gas scrubber schematically indicated in FIG. 1 the gas flow is from below to above, as indicated by the arrow. A carrier structure of which two carriers 3 are shown in section is arranged in the gas flow channel. A mist eliminator system is supported on this carrier structure. The mist eliminator system comprises two mist elimination layers 1, 2 in the shape of an upturned V. Each mist elimination layer 1, 2 consists of a row of parallel mist elimination profiles (lamella profiles) which are combined to packets through common lateral walls 5 and central walls 4.

For the support of the two mist elimination layers 1, 2 at the left and the right carrier 3 on the left side and on the right side a supporting structure 6 is provided which is a plate-like element having an outwardly angled flange 7 resting upon the carrier 3. The lateral walls 5 of the two mist elimination layers 1, 2 are fixed at the inner side of the plate-like supporting structure 6, for instance by means of screws or in a demountable manner, for example by the displaceable support in U-like holding means. The plate-like supporting structures 6 extend downwardly at least to the lower edge of the lateral wall 5 of the lower mist elimination layer 2 and upwardly at least to the upper edge of the lateral wall 5 of the upper mist elimination layer 1.

Furthermore, the mist eliminator system includes a connecting rod 8 extending through corresponding apertures in the two supporting structures 6 and resting upon the angled flanges 7 of the supporting structures 6. The connecting rod 8 serves for the stabilization of the mist eliminator system and is fixed to the two supporting structures 6 in a suitable manner.

Furthermore, the mist eliminator system has a rinsing means for rinsing the front and rear sides of the two mist elimination layers 1, 2. For rinsing the front side of the lower mist elimination layer 2 a cross rod 9 is provided at which a central rinsing nozzle is mounted. This cross rod 9 is fixed at the lower ends of the two supporting structures 6. The rear side of the lower mist elimination layer 2 and the front side of the upper mist elimination layer 1 are sprayed by means of nozzles 11 (spraying tubes) which are mounted at the connecting rod 8. Finally, the rear side of the upper mist elimination layer 1 is sprayed by nozzles 11 which are also arranged at a cross rod 9 which is supported by means of posts 10 mounted at the supporting structures 6.

Accordingly, the whole system is supported at two carriers 3 of a single carrier structure.

FIG. 2 shows a corresponding view as FIG. 1 with the single difference that here an upper V-like mist elimination layer 12 and a lower mist elimination layer 2 with the shape of an upturned V are provided wherein the apexes of the layers point against one another. Also in this case the mist elimination layers 2, 12 have central walls 4 and lateral walls 5 which are mounted at two common supporting structures. The supporting structures 6 have also an angled flange 7, respectively, which rests upon a carrier 3 of a single common carrier structure. Since according to this embodiment the distance of the lateral edges of the two mist elimination layers 2, 12 is even larger than with the embodiment of FIG. 1 the plate-like supporting structure 6 is formed even longer and extends further upwardly in FIG. 2 than in FIG. 1. The cross rod 9 for the spray tubes 11 is laterally mounted directly at the supporting structure 6 so that additional posts 10 are not necessary.

Since the two apexes of the mist elimination layers 2, 12 abut centrally against the connecting rod 8 here the corresponding spray tubes are not mounted centrally but at lateral sections of the connecting rod.

The invention claimed is:

1. A mist eliminator system for gas scrubbers, the system comprising:
an upstream and a downstream mist elimination layer relative to a gas-flow direction through the eliminator system, the layers each consisting of a row of parallel mist elimination profiles extending transverse to the direction from a respective outer lateral wall and each having the shape of a V or of an inverted V, lateral sections of each layer extending away from or parallel to the corresponding lateral sections of the other layer,
common support plates supporting both mist elimination layers supported on a single common carrier structure,
means for releasably securing the lateral walls of the mist elimination layers to the support plates, the plates extending in and against the flow direction past the lateral walls of the layers, and
respective upstream and downstream connecting rods extending transversely of the direction between and directly fixed in the plates upstream and downstream of the downstream and upstream layers.

2. The mist eliminator system according to claim 1, wherein one of the mist elimination layers is shaped as a V and the other mist elimination layer is shaped as an inverted V, apices of the layers pointing toward one another.

3. The mist eliminator system according to claim 1 wherein the common support plates each have an angled flange for support on the single carrier structure.

4. The mist eliminator system according to claim 1, further comprising rinsing means for rinsing the upstream or downstream side of at least one mist elimination layer, the rinsing means being mounted the common support plates.

5. The mist eliminator system according to claim 4, further comprising
a central connecting rod extending transversely of the direction between and directly fixed in the plates between the downstream and upstream layers and carrying nozzles directed upstream and downstream at the downstream and upstream layers and forming part of the rinsing means.

* * * * *